United States Patent
Peng et al.

(10) Patent No.: US 11,212,698 B2
(45) Date of Patent: Dec. 28, 2021

(54) COMMUNICATION METHOD AND COMMUNICATIONS DEVICE

(71) Applicant: HUAWEI TECHNOLOGIES CO., LTD., Guangdong (CN)

(72) Inventors: Wenjie Peng, Shanghai (CN); Mingzeng Dai, Shanghai (CN); Liwei Qiu, Shanghai (CN); Man Wang, Shanghai (CN); Xudong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 16/708,965

(22) Filed: Dec. 10, 2019

(65) Prior Publication Data
US 2020/0112875 A1 Apr. 9, 2020

Related U.S. Application Data

(63) Continuation of application No. PCT/CN2018/114315, filed on Nov. 7, 2018.

(30) Foreign Application Priority Data

Nov. 10, 2017 (CN) .......................... 201711105266.2

(51) Int. Cl.
*H04W 28/02* (2009.01)
*H04W 76/12* (2018.01)
(Continued)

(52) U.S. Cl.
CPC ... *H04W 28/0268* (2013.01); *H04W 28/0263* (2013.01); *H04W 76/11* (2018.02); *H04W 76/12* (2018.02); *H04W 84/20* (2013.01)

(58) Field of Classification Search
CPC ......... H04W 28/0268; H04W 28/0263; H04W 28/24; H04W 76/12; H04W 76/11;
(Continued)

(56) References Cited

U.S. PATENT DOCUMENTS

2019/0320476 A1* 10/2019 Wang ................ H04W 28/0268
2020/0015116 A1* 1/2020 Huang .................. H04W 28/02
(Continued)

FOREIGN PATENT DOCUMENTS

CN 106304411 A 1/2017
EP 3557902 A1 10/2019
(Continued)

OTHER PUBLICATIONS

Ericsson, "MN and SN role for QoS flow to DRB mapping", 3GPP TSG-RAN WG3 Meeting #97bis, R3-173952, Oct. 2017, pp. 1-17. (Year: 2017).*
(Continued)

*Primary Examiner* — Robert C Scheibel
(74) *Attorney, Agent, or Firm* — Fish & Richardson P.C.

(57) ABSTRACT

Example communication methods and apparatus are described. One example method includes that a first communications apparatus sends quality of service (QoS) flow information to a second communications apparatus, where a QoS flow indicated by the QoS flow information corresponds to at least one bearer type. The first communications apparatus receives a QoS flow list sent by the second communications apparatus based on the QoS flow information, where each QoS flow list is mapped to a radio bearer. The first communications apparatus sends a radio bearer identifier of the QoS flow list to the second communications apparatus. In the embodiments of this application, a base station itself determines a radio bearer or a DRB used to transmit the QoS flow.

18 Claims, 5 Drawing Sheets

(51) Int. Cl.
*H04W 76/11* (2018.01)
*H04W 84/20* (2009.01)

(58) Field of Classification Search
CPC ..... H04W 76/15; H04W 84/20; H04W 92/12; H04W 92/20
See application file for complete search history.

(56) References Cited

U.S. PATENT DOCUMENTS

| | | | | |
|---|---|---|---|---|
| 2020/0120535 | A1* | 4/2020 | Dai | H04W 76/15 |
| 2020/0252985 | A1* | 8/2020 | Vesely | H04W 76/11 |
| 2020/0260325 | A1* | 8/2020 | Futaki | H04W 76/22 |
| 2020/0389823 | A1* | 12/2020 | Xu | H04W 36/0061 |
| 2020/0396651 | A1* | 12/2020 | Wang | H04W 36/0044 |

FOREIGN PATENT DOCUMENTS

| | | | |
|---|---|---|---|
| WO | 2015062873 | A2 | 5/2015 |
| WO | 2017167203 | A1 | 10/2017 |
| WO | 2020032844 | A1 | 2/2020 |

OTHER PUBLICATIONS

Office Action issued in Indian Application No. 201937044193 dated Feb. 15, 2021, 6 pages.

Ericsson, "PDU Session, QoS flow and DRB control for NG-RAN DC," 3GPP TSG-RAN WG3 Meeting #97bis, R3-173954, Prague, Czech Republic, Oct. 9-13, 2017, 40 pages.

Extended European Search Report issued in European Application No. 18876562.2 dated May 12, 2020, 13 pages.

Huawei, "New IEs design for Option 7/7a/7x," 3GPP TSG-RAN WG3 #95bis, R3-171236; Spokane, Washington, XP051245946, Apr. 3-7, 2017, 4 pages.

Huawei, "QoS and Slice for Option 7," 3GPP TSG RAN WG3 Meeting #97bis, R3-173917, Prague, Czech Republic, XP051356739, Sep. 9-13, 2017, 19 pages.

Huawei, "QoS information transfer over F1," 3GPP TSG RAN WG3 meeting #97bis, R3-173722, Prague, Czech, Oct. 9-13, 2017, 3 pages.

Nokia et al., "Network Interfaces for EPC-based LTE-NR DC," 3GPP TSG-RAN WG3 Meeting #96, R3-171448, Hangzhou, P.R. China, May 15-17, 2017, 4 pages.

PCT International Search Report and Written Opinion issued in International Application No. PCT/CN2018/114315 dated Jan. 30, 2019, 13 pages (with English translation).

Samsung, "5G QoS model Support in Xn for Dual Connectivity," 3GPP TSG-RAN WG3 #96, R3-171642, Hangzhou, PR China, XP051265559, May 15-19, 2017, 3 pages.

ZTE Corporation, "QoS remaining aspects for NR-NR DC," 3GPP TSG-RAN WG2 Meeting #99bis, R2-1710440 (Revision of R2-1708124), Prague, Czech Republic, Oct. 9-13, 2017, 2 pages.

Huawei, "Support of QoS and slice for MR-DC with 5GC Alt1" 3GPP TSG RAN WG3 Meeting #98, R3-174580, Reno, Nevada, US, Nov. 27-Dec. 1, 2017, 20 pages.

Office Action issued in Japanese Application No. 2020-526011 dated Jun. 28, 2021, 7 pages (with English translation).

* cited by examiner

COMMUNICATION METHOD AND COMMUNICATIONS DEVICE

CROSS-REFERENCE TO RELATED APPLICATIONS

This application is a continuation of International Application No. PCT/CN2018/114315, filed on Nov. 7, 2018, which claims priority to Chinese Patent Application No. 201711105266.2, filed on Nov. 10, 2017, The disclosures of the aforementioned applications are hereby incorporated by reference in their entireties.

TECHNICAL FIELD

This application relates to the field of wireless communications technologies, and in particular, to a communication method and a communications device.

BACKGROUND

With development of wireless communications technologies, a future-oriented communications system is derived, for example, a 5th generation mobile communications (5G) system or a new radio (NR) system. In an example of long term evolution (LTE)-NR dual connectivity (DC), a terminal may perform data transmission based on both the LTE and the NR.

In the prior art, service data transmission between a network device and a terminal is directly configured by a core network device, and is implemented by using an evolved packet system (EPS) bearer. How the terminal transmits data to or receives data from a plurality of network devices based on a radio resource in a new communications system is an issue to be resolved urgently in the industry.

SUMMARY

This application describes a communication method and a communications device, so that a terminal transmits data to or receives data from a plurality of network devices based on a radio resource.

According to an aspect, an embodiment of this application provides a communication method. The method includes: sending, by a first communications apparatus, quality of service QoS flow information to a second communications apparatus, where a QoS flow indicated by the QoS flow information is corresponding to at least one bearer type; receiving, by the first communications apparatus, a QoS flow list sent by the second communications apparatus based on the QoS flow information, where any QoS flow list is mapped to a radio bearer; and sending, by the first communications apparatus, a radio bearer identifier of the QoS flow list to the second communications apparatus. In this method, a base station itself determines a radio bearer or a DRB used to transmit the QoS flow, thereby improving flexible configuration for the base station.

In a possible design, the QoS flow information includes the bearer type and all QoS flows corresponding to the bearer type.

In a possible design, the radio bearer identifier has a same arrangement order as the QoS flow list; or the method further includes:

sending, by the first communications apparatus, a mapping relationship between the radio bearer identifier and the QoS flow list to the second communications apparatus.

In a possible design, the QoS flow information further includes at least one of the following:

a QoS flow identifier, a QoS flow parameter, and a packet data unit session identifier PUD session ID and slicing slicing information that are corresponding to the QoS flow.

In a possible design, the method further includes:

receiving, by the first communications apparatus, at least one of types of the following information sent by the second communications apparatus:

a bearer type of a radio bearer of the QoS flow list; and a QoS flow parameter of the radio bearer of the QoS flow list.

In a possible design, the first communications apparatus is a primary base station, and the second communications apparatus is a secondary base station; or the first communications apparatus is a central unit CU, and the second communications apparatus is a distributed unit DU.

In a possible design, the first communications apparatus is the primary base station, and the second communications apparatus is the secondary base station; and when the bearer type is a secondary cell group split SCG split bearer or an SCG-MCG bearer, the method further includes:

sending, by the primary base station, a first GTP-U tunnel endpoint identifier to the secondary base station, where the first GTP-U tunnel endpoint identifier is used by the primary base station to receive downlink data of the SCG split bearer or the SCG-MCG bearer split by the secondary base station; and receiving, by the primary base station, a second GTP-U tunnel endpoint identifier sent by the secondary base station, where the second GTP-U tunnel endpoint identifier is used by the primary base station to send uplink data of the SCG split bearer or the SCG-MCG bearer to the secondary base station.

In a possible design, the method further includes:

receiving, by the primal), base station, a third GTP-U tunnel endpoint identifier sent by the secondary base station, where the third GTP-U tunnel endpoint identifier is used by the primary base station to send, to the secondary base station, uplink data of at least one of an SCG bearer, the SCG split bearer, or the SCG-MCG bearer that is converted from at least one of a master cell group MCG bearer, an MCG split split bearer, or an MCG-SCG bearer; or receiving, by the primary base station, a fourth GTP-U tunnel endpoint identifier sent by the secondary base station, where the fourth GTP-U tunnel endpoint identifier is used by the primary base station to send, to the secondary base station, downlink data of at least one of an SCG bearer, the SCG split bearer, or the SCG-MCG bearer that is converted from at least one of an MCG bearer, an MCG split split bearer, or an MCG-SCG bearer.

In a possible design, the QoS flow is uplink data or downlink data having a same QoS parameter.

According to another aspect, an embodiment of this application provides a first communications apparatus, including:

a sending module, configured to send quality of service QoS flow information to a second communications apparatus, where a QoS flow indicated by the QoS flow information is corresponding to at least one bearer type; and a receiving module, configured to receive a QoS flow list sent by the second communications apparatus based on the QoS flow information, where any QoS flow list is mapped to a radio bearer; and the sending module is further configured to send a radio bearer identifier of the QoS flow list to the second communications apparatus.

In a possible design, the QoS flow information includes the bearer type and all QoS flows corresponding to the bearer type.

In a possible design, the radio bearer identifier has a same arrangement order as the QoS flow list; or the sending module is further configured to send a mapping relationship between the radio bearer identifier and the QoS flow list to the second communications apparatus.

In a possible design, the QoS flow information further includes at least one of the following:

a QoS flow identifier, a QoS flow parameter, and a packet data unit session identifier PUD session ID and slicing slicing information that are corresponding to the QoS flow.

In a possible design, the receiving module is further configured to receive at least one of types of the following information sent by the second communications apparatus:

a bearer type of a radio bearer of the QoS flow list; and a QoS flow parameter of the radio bearer of the QoS flow list.

In a possible design, the first communications apparatus is a primary base station, and the second communications apparatus is a secondary base station; or the first communications apparatus is a central unit CU, and the second communications apparatus is a distributed unit DU.

In a possible design, the first communications apparatus is the primary base station, and the second communications apparatus is the secondary base station; and when the bearer type is a secondary cell group split SCG split bearer or an SCG-MCG bearer:

the sending module is further configured to send a first GTP-U tunnel endpoint identifier to the secondary base station, where first GTP-U tunnel endpoint identifier is used by the primary base station to receive downlink data of the SCG split bearer or the SCG-MCG bearer split by the secondary base station; or the receiving module is further configured to receive a second GTP-U tunnel endpoint identifier sent by the secondary base station, where the second GTP-U tunnel endpoint identifier is used by the primary base station to send uplink data of the SCG split bearer or the SCG-MCG bearer to the secondary base station.

In a possible design, when the bearer type further includes at least one of a master cell group MCG bearer, an MCG split split bearer, and a secondary cell group SCG bearer, the receiving module is further configured to:

receive a third GTP-U tunnel endpoint identifier sent by the secondary base station, where the third GTP-U tunnel endpoint identifier is used by the primary base station to send, to the secondary base station, uplink data of at least one of an SCG bearer, the SCG split bearer, or the SCG-MCG bearer that is converted from at least one of the master cell group MCG bearer, the MCG split split bearer, or an MCG-SCG bearer; or receive a fourth GTP-U tunnel endpoint identifier sent by the secondary base station, where the fourth GTP-U tunnel endpoint identifier is used by the primary base station to send, to the secondary base station, downlink data of at least one of an SCG bearer, the SCG split bearer, or the SCG-MCG bearer that is converted from at least one of the MCG bearer, the MCG split split bearer or an MCG-SCG bearer.

In a possible design, the QoS flow is uplink data or downlink data having a same QoS parameter.

According to another aspect, an embodiment of the present invention provides a network side device. The network side device may be a base station, or may be a control node.

According to another aspect, an embodiment of the present invention provides a communications apparatus. The apparatus has a function of implementing the foregoing method. The function may be implemented by hardware, or may be implemented by executing corresponding software by hardware. The hardware or the software includes one or more modules corresponding to the function.

In a possible design, a structure of the foregoing communications apparatus includes a processor and a transceiver. The processor is configured to support a base station in performing a corresponding function in the foregoing method. The transceiver is configured to support communication between the base station and a terminal, send information or an instruction in the foregoing method to the terminal, or receive information or an instruction sent by the terminal. The base station may further include a memory. The memory is configured to be coupled to the processor, and store a program instruction and data that are necessary for the base station.

According to still another aspect, this application provides a computer readable storage medium. The computer readable storage medium stores an instruction, and when the instruction is run on a computer, the computer is enabled to perform the method according to the foregoing aspects.

According to yet another aspect, this application provides a computer program product including an instruction. When the instruction is run on a computer, the computer is enabled to perform the method according to the foregoing aspects.

DESCRIPTION OF EMBODIMENTS

The following clearly and completely describes technical solutions in the embodiments of the present invention with reference to accompanying drawings in the embodiments of the present invention.

Figure 1A:
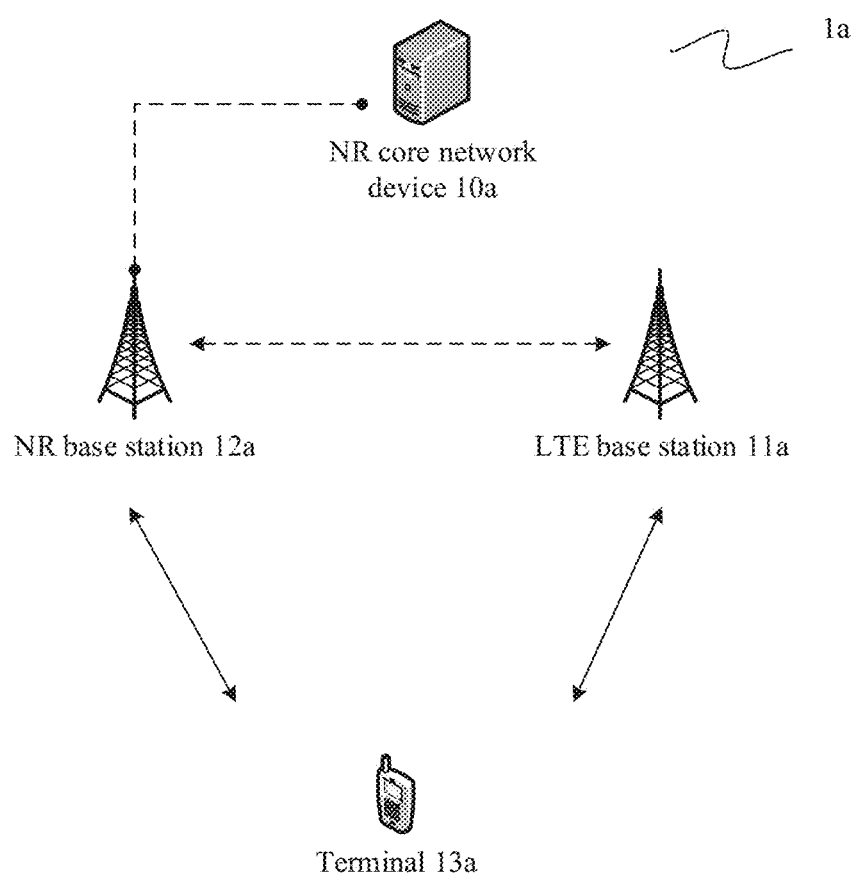
FIG. 1a is a schematic diagram of a communications system according to an embodiment of this application.
Figure 1B:
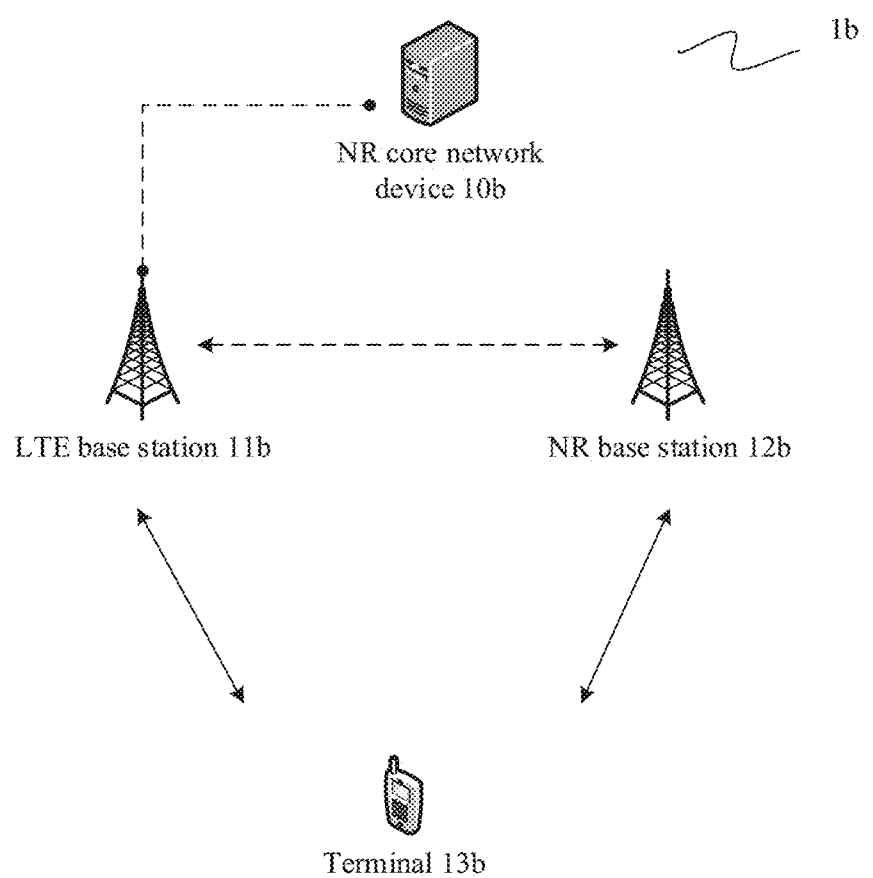
FIG. 1b is a schematic diagram of a communications system according to an embodiment of this application.
Figure 1C:
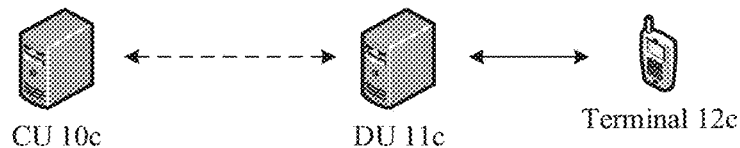
FIG. 1c is a schematic diagram of a communications system according to an embodiment of this application.

To solve a problem in the prior art that data transmission between different communications systems and a terminal cannot be performed simultaneously, the embodiments of the present invention provide a technical solution based on communications systems shown in FIG. 1a to FIG. 1c, to improve efficiency of data transmission in a system.

As shown in FIG. 1a to FIG. 1c, the embodiments of this application provide at east three communications systems, and detailed description is provided as follows.

FIG. 1a and FIG. 1b show dual connectivity with a terminal based on LTE and NR or LIE and LIE, For simplification of description, the following provides description by using an example of LTE-NR dual connectivity. For example, as shown in FIG. 1, a communications system includes at least one NR core network device 10a, one LTE base station 11a, and one NR base station 12a. The LTE base station 11a and the NR base station 12a simultaneously communicate with a terminal 13a. The NR base station 12a is a primary base station (master node, MN), the LIE base station 11a is a secondary base station (secondary node, SN). FIG. 1b is used as an example, a communications system b includes at least one NR core network device 10b, one LTE base station 11b, and one NR base station 12b. The LTE base station 11b and the NR base station 12b simultaneously communicate with a terminal 13b. The LTE base station 11b is a primary base station, and the NR base station 12b is a secondary base station. Between the primary base station and the core network device in the foregoing different communications systems, a control plane connection and a user plane connection may be established for the terminal. In the foregoing different communications systems, the secondary base station may establish a user plane connection and no control plane connection to the core network device. A person skilled in the art may understand that a communications system in which both primary and secondary base stations are LTE base stations or NR base stations is also applicable to the technical solution in the embodiment of the present invention.

As shown in FIG. 1c, a communications system includes at least a central unit (CU) 10c and a distributed unit (DU) 11c. The DU 11c communicates with a terminal 12c. For example, some functions of an NR base station are deployed on the CU, and remaining functions are deployed on the DU. In this case, there may be one or more DUs, and a plurality of DUs may share one CU, thereby reducing costs and facilitating network expansion. Specifically, division of the CU and the DU may be performed based on a protocol stack. A possible manner is to deploy at least one of the following protocol layers on the CU: a radio resource control (RRC) layer, a service data adaptation protocol (SD AP) layer, and a packet data convergence protocol (PDCP) layer. At least one of the following remaining protocol layers is deployed on the DU: a radio link control (RLC) layer, a media access control (MAC) layer, or a physical layer. The CU and the DU may be connected by using an F1 interface. The CU represents that the NR base station is connected to an NR core network. A person skilled in the art may understand that the CU and the DU may be located on different physical entities or be independent of the NR base station. In other words, the CU and the DU are combined to implement functions of the NR base station or replace the NR base station.

The system architecture and the service scenario described in the embodiments of the present invention are intended to describe the technical solutions in the embodiments of the present invention more clearly, and no limitation is imposed on the technical solutions provided in the embodiments of the present invention. A person of ordinary skill in the art may learn that: With the evolution of the network architecture and the emergence of new service scenarios, the technical solutions provided in the embodiments of the present invention are also applicable to similar technical issues.

In the embodiments of the present invention, the communications system may be various radio access technology (RAT) systems, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA), a long term evolution (LTE) system, and another LTE-evolution-based system. For example, the communications system 100 may further be applicable to a future-oriented communications technology such as the 5th mobile communications (5G). Any communications system using a new communications technology is applicable to the technical solutions provided in the embodiment of the present invention.

In the embodiments of the present invention, a communications apparatus is an apparatus that is deployed in a radio access network to provide a wireless communication function for the terminal. The communications apparatus may include various forms, for example, a macro base station, a micro base station (also referred to as a small cell or a microcell), a relay node (RN), and an access point. In a system in which different radio access technologies are used, names of a device having the foregoing functions may be different. For example, in the NR or the 5G, the device is referred to as a gNodeB (gNB) or an ng evolved NodeB (ng-eNB). In the LTE system, the device is referred to as an evolved NodeB (eNB or eNodeB). In a 3rd generation (3G) system, the device is referred to as a NodeB, or the like. In the embodiments of the present invention, any one of the following devices may be collectively referred to as a network side device or a communications apparatus: a base station, a control node connected to the base station, any network side device having a resource configuration function, a resource scheduling function or a resource multiplexing determining function. For ease of description, in all embodiments of the present invention, the foregoing apparatuses or network side devices that provide the wireless communication function for the terminal are collectively referred to as the communications system.

In the embodiments of the present invention, the communications system may further include a control node. The control node may be connected to at least one base station, and schedule all resources in a system. For example, the control node may configure a resource for the terminal, perform resource multiplexing determining, or perform interference coordination. For example, the base station may be a. NodeB in a UMTS system, and the control node may be a network controller. For another example, the base station may be a small cell or a micro base station, and the control node may be a macro base station that covers the small cell or the micro base station. For still another example, the control node may be a wireless network cross-standard coordinated controller, or the like, and the base station is a base station in a wireless network. This is not limited in the embodiments of the present invention.

The terminal in the embodiments of the present invention may include various handheld devices, vehicle-mounted devices, wearable devices, or computing devices that have a wireless communication function, or other processing devices connected to a wireless modem. Alternatively, the terminal may be referred to as a mobile station (MS for short), user equipment (UE), or a terminal device (terminal equipment), and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a session initiation protocol ("SIP" for short) phone, a computing device having a wireless communication function or a processing device connected to a wireless modem, a vehicle-mounted device, a wearable device, or the like. For ease of description, the devices mentioned above are collectively referred to as a terminal in all the embodiments of the present invention.

For ease of understanding for this application, before the communication method provided in this application is described, concepts in this application are first briefly described.

Figure 2:
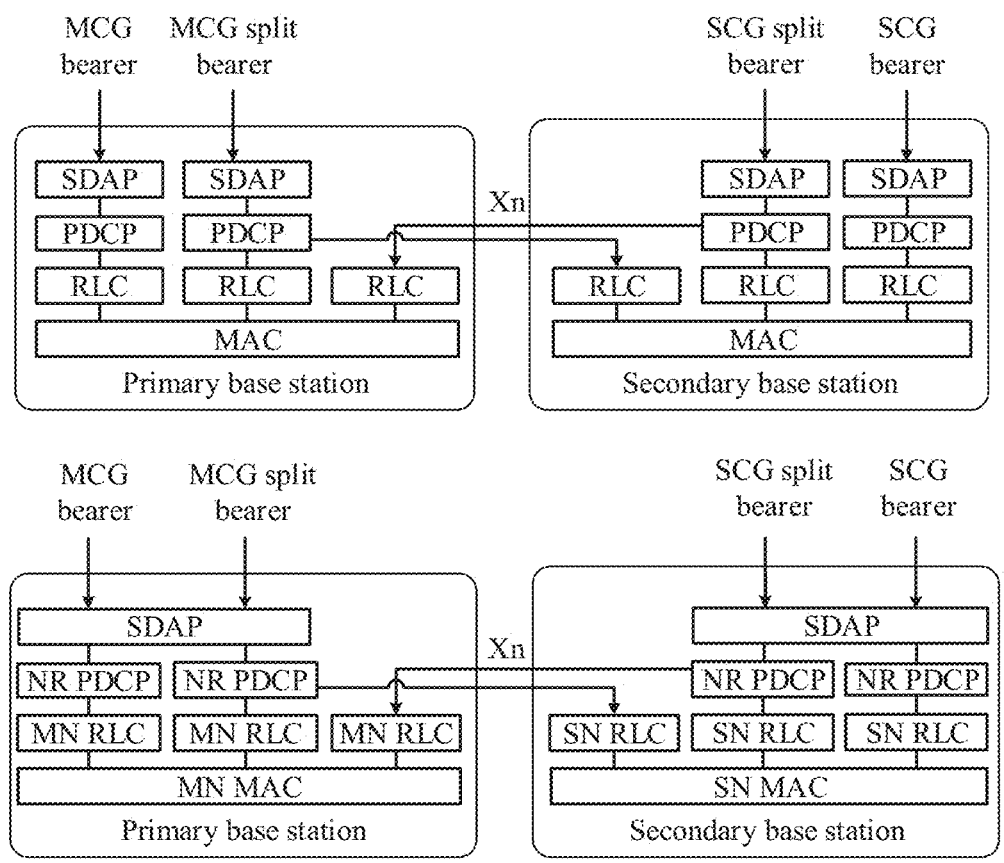
FIG. 2 is a schematic diagram of a user plane protocol stack according to an embodiment of this application.

Bearer: The communications system a in FIG. 1a is used as an example. As shown in FIG. 2, a bearer of a primary base station includes at least any one of or any combination of the following bearers: a master cell group (MCG) bearer and an MCG split bearer. A bearer of a secondary base station includes at least one of or any combination of the following bearers: a secondary cell group (SCG) bearer and an SCG split bearer. All data of the MCG bearer may be sent by the primary base station to a terminal, or sent by a terminal to the primary base station. The data of the MCG bearer does not require coordination of the secondary base station. All data of the SCG bearer may be sent by the secondary base station to the terminal, or sent by the terminal to the secondary base station. The data of the SCG bearer does not require coordination of the primary base station. For a downlink, the primary base station determines that a bearer type of a QoS flow delivered by a core network is an MCG split bearer, the primary base station performs splitting to send some data of the QoS flow to the secondary base station, and the secondary base station sends the some data of the QoS flow to the terminal; and the primary base station sends remaining data of the QoS flow to the terminal. For an uplink, the terminal directly sends some data of the MCG split bearer to the primary base station, and the secondary base station sends remaining data of the QoS flow to the primary base station. Alternatively, for a downlink, the primary base station determines that a bearer type of a QoS flow delivered by a core network is an SCG split bearer, the secondary base station performs splitting to send some data of the QoS flow to the primary base station, and the primary base station sends the some data of the QoS flow to a terminal; and the secondary base station sends remaining data of the QoS flow to the terminal. For an uplink, the terminal directly sends some data of the SCG split bearer to the secondary base station, and the primary base station sends remaining data of the SCG split bearer to the secondary base station. Optionally, in the embodiments of the present invention, there may be a bearer type for which data of QoS flow is delivered from the core network to the primary base station and then all the data is sent from the primary base station to the secondary base station, and is sent by the secondary base station to the terminal. For a corresponding uplink, the data is directly sent by the terminal to the secondary base station, and then is sent by the secondary base station to the primacy base station (for ease of description, the bearer type is referred to as an MCG-SCG bearer). The MCG-SCG bearer may be considered as one of bearers of the primary base station. Optionally, there may alternatively be a bearer type for which data of QoS flow is delivered from the core network to the secondary base station, sent by the secondary base station to the primary base station, and is sent by the primary base station to the terminal. For a corresponding uplink, the data is directly sent from the terminal to the primary base station, and then is sent by the primary base station to the secondary base station (for ease of description, the bearer type is referred to as an SCG-MCG bearer). The SCG-MCG bearer may be considered as one of bearers of the secondary base station. Bearers corresponding to the foregoing six bearer types may be collectively referred to as a radio bearer or a data radio bearer (DRB). In the embodiments, the primary and secondary base stations may separately determine radio bearers corresponding to different bearer types. For example, the primary base station may determine a radio bearer corresponding to an MCG an MCG split or an MCG-SCG and the secondary base station may determine a radio bearer corresponding to an SCG an SCG split or an SCG-MCG A quality of service (QoS) flow includes data flows or data packets having a same QoS parameter or similar QoS parameters. Based on communication between a base station and a terminal, the QoS flow may be understood as uplink data and/or downlink data having a same QoS parameter. For example, a core network device maps an internet protocol (IP) packet or an IP flow to a QoS flow, and IP packets or IP flows in the QoS flow may have a same QoS parameter or similar QoS parameters. Then, the base station maps at least one QoS flow in one packet data unit (PDU) session to one DRB, and when data in the DRB is transmitted between the base station and the terminal, a same QoS parameter may be used. The QoS parameter may be used to reduce a data transmission latency and decrease an error rate. The PDU session may be a connection between the terminal and a communications network, to provide a packet data unit connection service. A PDU (packet data unit) includes various types of data units. For example, an IP packet, an untrusted packet data unit (PDU), or Ethernet frames may be included.

Protocol stack: A terminal may communicate with a base station based on a wireless air interface, and protocol stacks are classified into a user plane protocol stack and a control plane protocol stack based on purposes. User plane protocol stacks of the primary and secondary base stations shown in FIG. 2 may sequentially include a service data adaptation protocol (SDAP) layer, a packet data convergence protocol (PDCP) layer, a radio link control (RLC) layer, and a media access control (MAC) layer. The base station is used as an example. The SDAP layer may correspond to one or more PDCP entities, or may be divided into a plurality of SDAP entities, to separately correspond to PDCP entities of a same quantity. The SDAP entity may have any one of or a combination of the following functions: transmitting user plane data; for uplink and downlink data, mapping a QoS flow to a corresponding DRB; adding QoS flow identifiers for the uplink and the downlink data; and reflecting a mapping relationship between a QoS flow and a DRB to an uplink SDAP PDU. The RLC entity and the MAC layer may be connected by using a logical channel. For another example, the MAC layer is used to provide data transmission on the logical channel, and different logical channels are defined based on data of different service types. Main functions of the PDCP layer are packet header compression and decompression of the user plane data, security functions such as encryption and decryption on a user plane and a control plane, integrity protection and verification of control plane data.

In the prior art, a core network device first maps an IP packet or an IP flow to an EPS bearer A plurality of IP packets may form one IP flow. Based on the EPS bearer, the core network device establishes an S1 bearer on an S1 interface between the core network device and a base station, and the base station establishes a data radio bearer (DRB) between the base station and a terminal. In other words, there is a mapping relationship between the EPS bearer, the S1 bearer, the DRB, and an E-RAB. EPS bearers, S1 bearers, DRBs, and E-RABs are in a one-to-one correspondence with each other. Then, data transmitted by the core network device to the base station is data carried in the S1 bearer, and data transmitted by the base station to the terminal is data carried in the DRB. Therefore, the core network allocates all EPS bearers, and this leads to no diversity of resource allocation between the base station and the terminal, reducing efficiency of data transmission between the base station and the terminal.

In an NR network, an ultra-reliable and low-latency communications (URLLC) technology is introduced, and has a strict requirement on a data transmission latency and transmission reliability. For example, a URLLC service data latency is less than 0.5 ms, or a URLLC service data transmission success rate is not less than 99.999%. Because a terminal may include the foregoing various uplink services correspondingly, bearer types required for different services between the terminal and a base station also need to be diversified. In the embodiments of the present invention, the service may be an Internet of things service, a voice service, an MBB service, a URLLC service, or the like. For ease of description, in all embodiments of the present invention, the foregoing service or service data is collectively referred to as uplink data, namely, data transmitted by the terminal to the base station, or downlink data, namely, data transmitted by the base station to the terminal.

In the embodiments of the present invention, for the QoS flow sent by the core network device or the QoS flow received by the core network device, the base station may determine, by itself, the radio bearer or the DRB that is used to transmit the QoS flow, to improve configuration flexibility of the base station. For example, the base station may determine a quantity of DRBs, or determine a mapping relationship between a QoS flow and a DRB.

Figure 3:
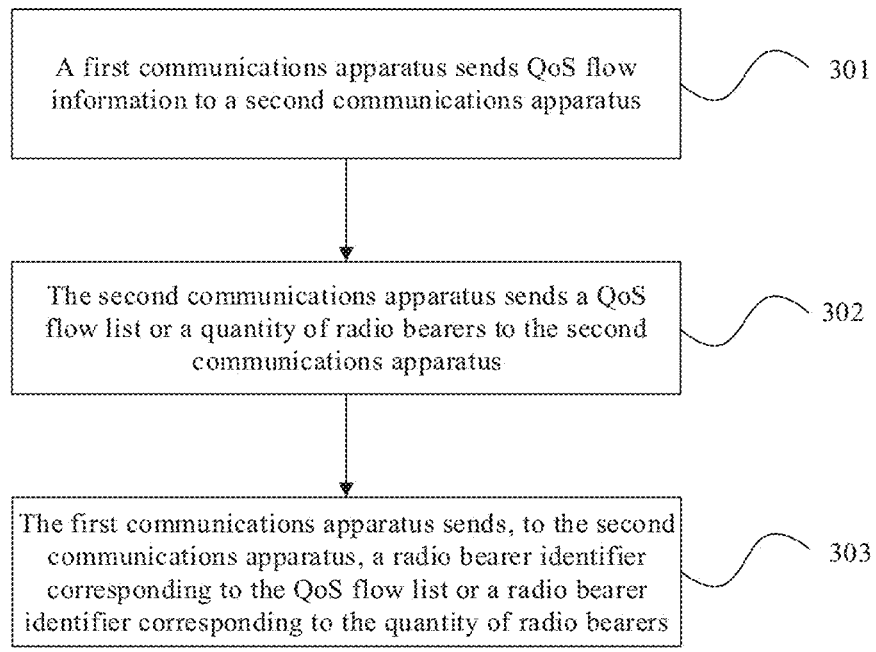
FIG. 3 is a schematic flowchart of a communication method according to an embodiment of this application.

FIG. 3 is a schematic flowchart of a communication method according to an embodiment of this application. In a DC scenario, in the following, a first communications apparatus is a primary base station, and a second communications apparatus is a secondary base station. In a CU-DU scenario, the first communications apparatus is a CU, and the second communications apparatus is a DU. The primary base station, the secondary base station, the CU, and the DU may be chips, or may be implemented by chips, and this is not limited in this embodiment of this application. The method includes the following steps:

301. The first communications apparatus sends QoS flow information to the second communications apparatus.

302. The second communications apparatus sends a QoS flow list or a quantity of radio bearers to the first communications apparatus.

303. The first communications apparatus sends, to the first communications apparatus, a radio bearer identifier corresponding to the QoS flow list or a radio bearer identifier corresponding to the quantity of the radio bearers.

In step 301, the QoS flow information indicates a QoS flow, and the QoS flow may be uplink data or downlink data having a same QoS parameter. The QoS flow indicated by the QoS flow information corresponds to at least one bearer type. The QoS flow information may include at least one of or any combination of the following: a QoS flow identifier, a QoS flow parameter of the QoS flow, an identifier of a PDU session to which the QoS flow belongs, or slicing information. For example, the first communications apparatus sends the QoS flow identifier to the second communications apparatus, where the QoS flow identifier is used by the second communications apparatus to determine a QoS flow corresponding to the QoS flow identifier.

For service data mapped to a same QoS flow, the QoS flow parameter may be used by a base station a terminal to perform same or similar processing on the service data, for example, a scheduling policy, a queue management policy, a rate adjustment policy, and RLC configuration. The QoS flow parameter may include at least one of or any combination of the following: QoS indication, allocation and reservation priorities, a resource type, a priority level, a packet delay budget, a packet error rate, an average window, a downlink maximum flow bit rate, an uplink maximum flow bit rate, a downlink guaranteed bit rate, an uplink guaranteed bit rate, a notification control parameter, and an attribute of a transmitted QoS.

The PDU session to which the QoS flow belongs may be understood as that a plurality of QoS flows may belong to one PDU session. At least one PDU session is established between a core network device and the base station, and each PDU session includes at least one QoS flow. Then, the base station maps the QoS flow to the radio bearer, and each radio bearer corresponds to at least one QoS flow.

In the DC scenario, the primary base station may determine a bearer type corresponding to the QoS flow. For example, the primary base station maps some QoS flows to at least one of an MCG-SCG bearer, an MCG bearer, and an MCG split bearer, and maps a remaining QoS flow to at least one of an SCG-MCG, an SCG bearer, and an SCG split bearer. The mapping may be understood as that a QoS flow mapped to the MCG-SCG bearer, the MCG bearer, and the MCG split, and a QoS flow mapped to the SCG-MCG bearer, the SCG bearer, and the SCG split bearer may belong to a same PDU session, or may belong to different PDU sessions. Then, the primary and secondary base stations separately perform mapping of QoS flows and radio bearers for different bearer types. Compared with that in the prior art, a core network device directly performs mapping between a QoS flow and a radio bearer, the technical solution of this embodiment of the present invention can increase a degree of determining freedom of the base station and improve configuration flexibility of the base station.

In the CU-DU scenario, the CU may be used for joint management. The CU maps the QoS flow to the radio bearer, and communicates with the terminal by using at least one DU.

For different bearer types, the following describes in detail the DC scenario and the CU-DU scenario.

1. MCG split bearer: In the DC scenario in this embodiment of the present invention, the MCG split bearer may be split and sent to the secondary base station by a PDCP layer of the primary base station, and is used for downlink transmission to the terminal, or is directly transmitted by the primary base station to the terminal. Similarly, the terminal may perform uplink transmission of the MCG split bearer to the primary base station based on the secondary base station, or the MCG split bearer may be directly transmitted by the terminal to the primary base station. The primary base station may send, to the secondary: base station, at least one of or any combination of the following: a mapping relationship between the QoS flow and the radio bearer, the PDU session identifier, and a QoS flow parameter of the radio bearer. At least one QoS flow may be mapped to one radio bearer.

2. SCG-MCG bearer, SCG bearer, or SCG split bearer: In the DC scenario in this embodiment of the present invention, when a bearer type of the QoS flow is an SCG bearer, service data corresponding to the QoS flow may be sent by the secondary base station to the terminal; when a bearer of the QoS flow is an SCG split bearer, service data corresponding to the QoS flow may be sent by the secondary base station to the terminal, or may be sent by the secondary base station to the terminal in coordination with the primary base station; or when a bearer of the QoS flow is an SCG-MCG bearer, all service data corresponding to the QoS flow may be sent by the secondary base station to the terminal in coordination with the primary base station. The foregoing service data may include uplink and downlink transmission between the terminal and a network device.

Optionally, in the DC scenario, the primary base station may further send the foregoing bearer type of the QoS flow to the secondary base station. In this embodiment of the present invention, the primary base station may send the bearer type and all QoS flows corresponding to the bearer type to the secondary base station. For example, the primary base station sends the SCG bearer type and all QoS flows associated with the SCG bearer type, the SCG split bearer and all QoS flows associated with the SCG split bearer, or the SCG-MCG bearer type and all QoS flows associated with the SCG-MCG bearer type to the secondary base station. The foregoing association manner may be shown in a form of a list. For example, QoS flows in a list 1 are all identified as SCG bearers, QoS flows in a list 2 are all identified as SCG split bearers, and QoS flows in a list 3 are identified as SCG-MCG bearers. For another example, a table header of a list 1 is identified as an SCG bearer, and all QoS flows in the list may be considered as SCG bearers; a table header of a list 2 is an SCG split bearer, and all QoS flows in the list may be considered as SCG split bearers; and a table header of a list 3 is an SCG-MCG bearer, and all QoS flows in the list may be considered as SCG-MCG bearers. When the QoS flows correspond to different radio bearers, such as the SCG bearer, the SCG split bearer, and the SCG-MCG bearer, the secondary base station may separately map, based on different bearer types sent by the primary base station, the QoS flows to different QoS flow lists, thereby improving communication efficiency of the secondary base station. For example, the secondary base station maps QoS flows of a same bearer type to at least one QoS flow list, and maps QoS flows of different bearer types to different QoS flow lists. A person skilled in the art may understand that a list sent by the primary base station or the QoS flow list sent by the secondary base station may be presented in different forms, and the forms include but are not limited to a list, a bitmap, an index, and the like. All manners in which a receiver can receive or identify the foregoing QoS flows shall fall within the protection scope of this embodiment of this application.

Optionally, in the CU-DU scenario, because the CU needs to communicate with the terminal in coordination with the DU, without using a solution in which the CU communicates with the terminal independently, the CU may not need to send the bearer type of the QoS flow to the DU.

In the DC scenario in this embodiment of the present invention, when a new secondary base station or a new cell served by the base station needs to be added to communicate with the terminal, the primary base station may send, by using a secondary base station addition request (SN addition request) or a request message that is before a secondary base station addition request message, the QoS flow information and/or the bearer type of the QoS flow to the secondary base station.

In the CU-DU scenario in this embodiment of the present invention, the CU sends QoS flow information to the DU by using a user equipment context setup request WE context setup request). The request may be applicable to processes of the terminal such as initial network access, attachment, a tracking area update, random access, and this is not limited in the present invention.

For step 302, two different implementations are described in the following.

Manner 1. The second communications apparatus sends the QoS flow list to the first communications apparatus.

In this manner, the second communications apparatus maps a corresponding QoS flow to at least one QoS flow list, and maps any one of the QoS flow lists to one radio bearer, based on received QoS flow information. Alternatively, a same QoS flow list may include QoS flows of a same bearer type. For example, the second communications apparatus sends a first QoS flow list, a second QoS flow list and a third QoS flow list to the first communications apparatus, Radio bearers of all QoS flows in the first QoS flow list that are received by the first communications apparatus are of a same bearer type, and radio bearers of all QoS flows in the second. QoS flow list are of a same bearer type, and radio bearers of all QoS flows in the third QoS flow list are of a same bearer type. In the first to the third QoS flow lists, all QoS flows in any one of the QoS flow lists may be configured by the second communications apparatus jointly as any one of the SCG bearer, the SCG split bearer, or the SCG-MCG bearer. For example, all the QoS flows in the first QoS flow list are SCG bearers, all the QoS flows in the second QoS flow list are SCG split bearers, and all the QoS flows in the third QoS flow list are SCG-MCG bearers. Therefore, the first communications apparatus may determine, based on the received QoS flow lists, radio bearers that are allocated to a second base station and that are respectively corresponding to the QoS flow lists. For example, the first communications apparatus maps the received first to third QoS flow lists to three radio bearers respectively. A person skilled in the art may understand that for any QoS flow list configured by the second communications apparatus, in a form of a QoS flow list. QoS flows in a same QoS flow list are of a same bearer type, and different QoS flow lists may be of a same bearer type or different bearer types. For example, all bearer types of the first to the third. QoS flow lists, in a form of a QoS flow list, may be different, may be pairwise identical, or may be identical.

In this embodiment of the present invention, any QoS flow list may be mapped to any radio bearer. Specifically, when there is one first QoS flow list, the first QoS flow list is mapped to one radio bearer; and when there is one second QoS flow list, the second QoS flow list is mapped to one radio bearer. When there are at least two first QoS flow lists, the at least two first QoS flow lists are mapped to at least two radio bearers of a same quantity; and when there are at least two second QoS flow lists; the at least two first QoS flow lists are mapped to at least two radio bearers of a same quantity.

Manner 2. The second communications apparatus sends the quantity of radio bearers to the first communications apparatus.

In this manner, the quantity of radio bearers may correspond to a quantity of QoS flow lists determined by the second communications apparatus. In other words, the quantity of radio bearers is the same as that of QoS flow lists, and the radio bearers are respectively used to carry service data corresponding to QoS flows in different QoS flow lists. Specifically, the radio bearers corresponding to the quantity of radio bearers may be of a bearer type in the foregoing QoS flow list. In this manner, the first communications apparatus may directly configure, based on obtained quantity of radio bearers, a same quantity of radio bearers for the first communications apparatus, thereby simplifying operations and configuration of the first communications apparatus.

Optionally; for an updated secondary base station or an updated cell served by the secondary base station in the DC scenario, the secondary base station may send the QoS flow list or the quantity of radio bearers to the primary base station by using a secondary base station update request (SN modification request). For a newly added secondary base station or a newly added cell served by the secondary base station, the secondary base station sends the QoS flow list or the quantity of radio bearers to the primary base station by using a secondary base station addition request acknowledgement (SN addition request ack) or a request message that is before secondary base station addition request acknowledgement.

Optionally, in the CU-DU scenario, the DU sends the QoS flow list or the quantity of radio bearers to the CU by using a user equipment context setup response (UE context setup response).

In this embodiment of the present invention, the second communications apparatus may further send at least one of or any combination of the following to the first communications apparatus:

a QoS parameter of a radio bearer corresponding to the QoS flow list, where the parameter is determined or updated by the second communications apparatus; and a bearer type of the radio bearer of the QoS flow list.

Alternatively, the second communications apparatus may further reject a QoS flow sent by the first communications apparatus. The QoS flow may be sent to the first communications apparatus by using a QoS flow identifier or other indication information. A person skilled in the art may understand that all information that may be used by the first communications apparatus to identify the QoS flow shall fall within the protection scope of this embodiment of the present invention.

Optionally, the second communications apparatus may determine, based on a QoS parameter of the QoS flow, a current load status of the second communications apparatus, or a current air interface status of the second communications apparatus, whether to update the QoS parameter of the QoS flow to the QoS parameter of the radio bearer corresponding to the QoS flow list.

For step 303, different implementations of sending the radio bearer identifier to the second communications apparatus by the first communications apparatus are described in the following.

Manner 1. In a solution in which the second communications apparatus sends a QoS flow list to the first communications apparatus, a plurality of first QoS flow lists are used as an example, two possibilities are enumerated in the following.

1. Radio bearer identifiers sent by the first communications apparatus to the second communications apparatus have a same arrangement order as the first QoS flow lists. For example, the first communications apparatus may map the first QoS flow lists to radio bearers in a one-to-one manner or allocates radio bearer identifiers to the first QoS flow lists in a one-to-one manner. In other words, a quantity of first QoS flow lists is the same as that of corresponding radio bearer identifiers. Based on the same arrangement order as the QoS flow lists, the second communications apparatus may identify the first QoS flow lists corresponding to the radio bearer identifiers sent by the first communications apparatus, so that all QoS flows in the first QoS flow list are transmitted by using the radio bearers corresponding to the radio bearer identifiers. This manner saves resources for communication between the first and second communications apparatuses, and improves system efficiency.

2. The first communications apparatus may send a mapping relationship between a radio bearer identifier and a first QoS flow list to the second communications apparatus. The first communications apparatus sends a plurality of radio bearer identifiers whose quantity is the same as that of first QoS flow lists, and a mapping relationship between the radio bearer identifiers and the first QoS flow lists to the second communications apparatus. The radio bearer identifiers and the mapping relationship are used by the second communications apparatus to identify a radio bearer corresponding to the received radio bearer identifier and a specific first QoS flow list corresponding to the radio bearer.

In the foregoing two cases, for a mapping manner between a second QoS flow list and a radio bearer or a radio bearer identifier allocation manner, refer to the mapping manner between a first QoS flow list and a radio bearer, and details are not described again. As described above, the first and the second oS flow lists may separately correspond to a same bearer type or different bearer types.

Manner 2. A solution in which the second communications apparatus sends the quantity of radio bearer identifiers to the first communications apparatus.

When the second communications apparatus feeds back a required quantity of radio bearer identifiers, the first communications apparatus provides a corresponding radio bearer identifier list. In this embodiment of the present invention, bearer data transmission between the primary and secondary base stations may be performed by using a general packet radio service (GPRS) tunneling protocol (GPRS tunneling protocol, GTP) in the DC scenario. The data transmission includes data fronthaul between the primary and secondary base stations in a bearer type change process, and data splitting and combining of at least one of the MCG-SCG bearer, the SCG-MCG bearer, the MCG split bearer, and the SCG split bearer in a normal transmission process.

Data fronthaul is described by using an example in which any one of the MCG-SCG bearer, the MCG bearer, and the MCG split bearer is adjusted into any one of the SCG-MCG bearer, the SCG bearer, or the SCG split bearer. For downlink data, the primary base station needs to send, to the secondary base station in a fronthaul manner, newly received data or data that fails to be sent; and the secondary base station sends the data to the terminal. For uplink data, the primary base station needs to send, to the secondary base station in a fronthaul manner, data that is received from the terminal and that is not sent to an upper layer yet; and the secondary base station sends the data to the upper layer. Uplink and downlink transmission are described in the following.

When establishing the SCG-MCG bearer, the SCG bearer, the SCG split bearer, or a bearer of another PDCP entity in the secondary base station based on a primary base station request, the secondary base station needs to allocate a GTP-U tunnel endpoint identifier (TEID) used for data fronthaul to the foregoing bearer. The secondary base station allocates different TEIDs for the uplink data and the downlink data, to distinguish between uplink and downlink transmission. Based on the TEID, the primary base station sends data for which fronthaul is required to the secondary base station. When the secondary base station sends the QoS flow list or a quantity of data radio bearer identifiers to the primary base station, the GTP-U TEID used for data fronthaul may be sent to the primary base station together with the QoS flow list or the quantity of data radio bearer identifiers; or when the secondary base station sends configuration information allocated to the terminal by the secondary base station to the primary base station, the GTP-U TEID used for data fronthaul may be sent to the primary base station together with the configuration information.

In this embodiment of the present invention, in a DC, for a bearer of a PDCP entity in the secondary base station and a bearer of an RLC entity in the primary base station, for example, the SCG split bearer and the SCG-MCG bearer, the secondary base station maps a QoS flow of at least one of the foregoing bearers to the radio bearer. The following describes uplink/downlink data corresponding to the radio bearer.

Based on the uplink data, the secondary base station may allocate a GTP-U TEID to a corresponding bearer and send the GTP-U TEID to the primary base station, so that the secondary base station receives service data sent by the terminal to the primary base station. When the secondary base station sends the QoS flow list or a quantity of data radio bearer identifiers to the primary base station, the GTP-U TEID may be sent to the primary base station together with the QoS flow list or the quantity of data radio bearer identifiers; or when the secondary base station sends, to the primary base station, configuration information allocated to the terminal by the secondary base station, the GTP-U TEID may be sent to the primary base station together with the configuration information. For example, when a secondary base station or a cell served by a secondary base station is added, the secondary base station adds the foregoing TEID to an SN addition request ack or a message that is before a secondary base station addition request acknowledgement message. When the secondary base station or a cell served by the secondary base station is updated, the secondary base station adds the foregoing TEID to a secondary base station update request (SN modification required) or a secondary base station update request acknowledgement (SN modification request ack).

Based on the downlink data, the primary base station may allocate a GTP-U TEID to a corresponding bearer and send the GTP-U TEID to the secondary base station, so that the secondary base station sends service data to the terminal via the primary base station. When the primary base station sends the radio bearer identifier to the secondary base station, the GTP-U TEID may be sent to the secondary base station together with the radio bearer identifier. For example, when a secondary base station or a cell served by a secondary base station is added, the primary base station adds the foregoing TEM to an SN configuration complete or an SN addition request. When a secondary base station or a cell served by the secondary base station is updated, the primary base station adds the foregoing TEID to a secondary base station update request (SN modification request). Specifically, the secondary base station generates at least one QoS flow list based on different bearer types and the QoS flow sent by the primary base station. QoS flows in each QoS flow list are of a same bearer type, and different QoS flow lists may be of a same bearer type or different bearer types. For the SCG split bearer, the secondary base station maps each QoS flow list whose bearer type is an SCG split bearer to a radio bearer, and each radio bearer corresponds to one TEID.

In this embodiment of the present invention, for a bearer of a PDCP entity in secondary base station or a bearer of an RLC entity in the primary base station, for example, the MCG split bearer and the MCG-SCG bearer, the secondary base station maps at least one of the foregoing bearers to the radio bearer. The following describes uplink/downlink data corresponding to the radio bearer.

Based on the downlink data, the secondary base station may allocate a GTP-U TEID to a corresponding bearer and send the GTP-U TEID to the primary base station, so that the secondary base station receives service data sent by the terminal to the primary base station. When the secondary base station sends the QoS flow list or a quantity of data radio bearer identifiers to the primary base station, the GTP-U TEID may be sent to the primary base station together with the QoS flow list or the quantity of data radio bearer identifiers; or When the secondary base station sends, to the primary base station, configuration information allocated to the terminal by the secondary base station, the GTP-U TEID may be sent to the primary base station together with the configuration information. For example, when a secondary base station or a cell served by the base station is added, the secondary base station adds the foregoing TEID to an SN addition request ack or a message that is before an SN addition request ack message. When the secondary base station or a cell served by the secondary base station is updated, the secondary base station adds the foregoing TEM to a secondary base station update request acknowledgement (SN modification required) or a secondary base station update request acknowledgement (SN modification request ack).

Based on the uplink data, the primary base station may allocate a GTP-U TEID to a corresponding bearer and send the GTP-U TEID to the secondary base station, so that the secondary base station sends service data to the terminal via the primary base station. When the primary base station sends the radio bearer identifier to the secondary base station, the GTP-U TEID may be sent to the secondary base station together with the radio bearer identifier. For example, when a secondary base station or a cell served by a base station is added, the primary base station adds the foregoing TEID to an SN configuration complete, an SN addition request, or a message that is before an SN addition request message. When the secondary base station or a cell served by the secondary base station is updated, the primary base station adds the foregoing TEM to a secondary base station update request (SN modification request). Specifically, the secondary base station generates at least one QoS flow list based on different bearer types and the QoS flow sent by the primary base station. QoS flows in each QoS flow list are of a same bearer type. For the SCG split bearer, the secondary base station maps each QoS flow list whose bearer type is an SCG split bearer to a radio bearer, and each radio bearer corresponds to one TEID.

In this embodiment of the present invention, transmission of uplink and downlink data corresponding to the radio bearer between the CU and the DU in the CU-DU scenario are described in the following.

Based on the downlink data, the DU sends a TEID corresponding to a radio bearer identifier to the CU, so that the CU transmits service data to the terminal via the DU. When the DU sends a QoS flow list or a quantity of data radio bearer identifiers to the CU, the foregoing TEID may be sent to the CU together with the QoS flow list or the quantity of data radio bearer identifiers; or when the DU sends configuration information that is allocated to the CU by the DU, the foregoing TEID may be sent to the CU together with the configuration information. For example, the TEID may be carried in a UE context setup response and be sent by the DU to the CU, or may be carried in a user equipment context setup complete (UE context setup complete) and be sent by the DU to the CU, after the DU receives a UE context setup ack sent by the CU.

Based on the uplink data, the CU sends a TEID corresponding to a radio bearer identifier to the DU, so that the terminal transmits service data to the CU via the DU. When the CU sends the radio bearer identifier to the DU, the GTP-U TEED may be sent to the DU together with the GTP-U TEID. The TEID may be carried in a UE context setup ack and be sent by the CU to the DU.

In this embodiment of the present invention, the CU may send a QoS flow identifier to the DU based on a GTP-U tunnel. For example, the CU adds the QoS flow identifier to a GTP-U header of a GTP-U data packet to be sent to the DU, and the QoS flow identifier is used by the DU to obtain QoS flow information corresponding to the data packet. A person skilled in the art may understand that regardless of whether mapping between a QoS flow list and a radio bearer is determined by the CU or DU, the CU can add the QoS flow identifier to the GTP-U header.

Figure 4:
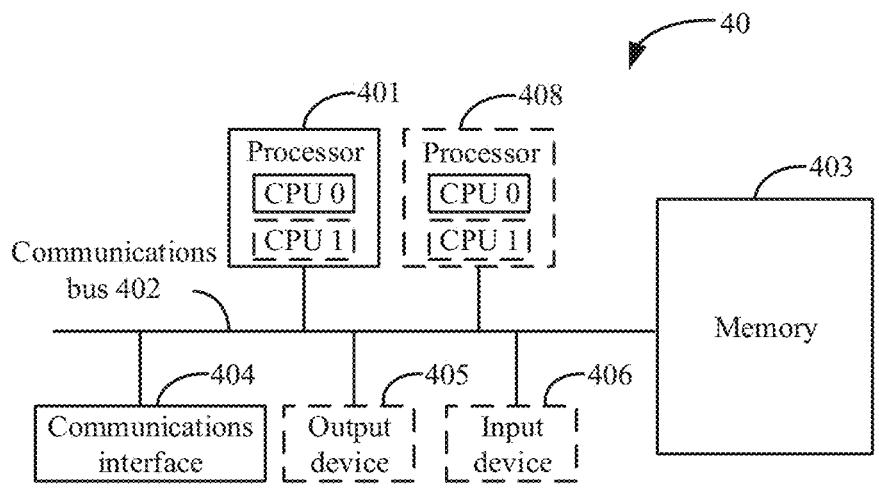
FIG. 4 is a schematic structural diagram of a communications apparatus according to an embodiment of this application.

FIG. 4 is a schematic structural diagram of hardware of a communications apparatus 40 according to an embodiment of this application. The communications apparatus 40 includes at least one processor 401, a communications bus 402, a memory 403, and at least one communications interface 404.

The processor 401 may be a general-purpose central processing unit ( ), a microprocessor, an application-specific integrated circuit (ASIC), or one or more integrated circuits configured to control program execution in the solutions of this application.

The communications bus 402 may include a channel, to transfer information between the foregoing components.

The communications interface 404 uses any apparatus such as a transceiver to communicate with another device or a communications network, such as the Ethernet, a radio access network (RAN), or a wireless local area network (MILAN).

The memory 403 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. This is not limited herein. The memory may exist independently, and is connected to the processor by using a bus. The memory may be integrated with the processor.

The memory 403 is configured to store and execute application program code in a solution of this application, and the processor 401 controls execution. The processor 401 is configured to execute the application program code stored in the memory 403, to implement the communication method according to the foregoing embodiment of this application.

Alternatively, optionally, in this embodiment of this application, the processor 401 may perform processing related functions in the communication method provided in the foregoing embodiment, and the communications interface 404 is responsible for communication with another device or a communications network. This is not specifically limited in this embodiment of this application.

During specific implementation, in an embodiment, the processor 401 may include one or more CPUs, for example, a CPU 0 and a CPU 1 in FIG. 4.

During specific implementation, in an embodiment, the communications apparatus 40 may include a plurality of processors, for example, the processor 401 and a processor 408 in FIG. 4. Each of the processors may be a single-core processor (single-CPU), or may be a multi-core processor (multi-CPU). The processor herein may be one or more devices, circuits, and/or processing cores for processing data (for example, computer program instructions). It may be understood that FIG. 4 shows only a simplified design of the communications apparatus 40. During actual application, the communications apparatus may include any quantity of input devices, output devices, processors, memories, and communications interfaces, and the foregoing functions may be provided by any quantity of communications units separately or in a manner of a combination.

During specific implementation, in an embodiment, the communications apparatus 40 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401, and may receive a user input in a plurality of manners. For example, the input device 406 may be a mouse, a keyboard, a touchscreen device, a sensor device, or the like.

In addition, as described above, the communications apparatus 40 provided in this embodiment of this application may be a chip, a base station, a CU, a DU, or a device with a similar structure as that in FIG. 4. A type of the communications apparatus 40 is not limited in this embodiment of this application.

Figure 5:
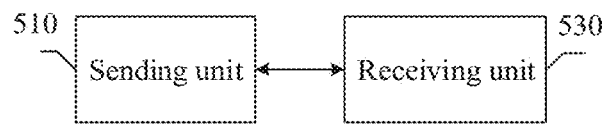
FIG. 5 is a schematic structural diagram of a communications apparatus according to an embodiment of this application.

FIG. 5 is a schematic structural diagram of a first communications apparatus according to an embodiment of this application. Meanings or functions of the following terms or nouns may be understood with reference to the foregoing description, and details or implementations of the following steps or actions may also be understood with reference to the foregoing description. As shown in FIG. 5, the first communications apparatus 500 may include a sending unit 510 and a receiving unit 530. The sending unit 510 and the receiving unit 530 may separately be connected to a bus.

The sending unit 510 and the receiving unit 530 may be configured to support the first communications apparatus and a second communications apparatus in receiving and sending information. Alternatively, the sending unit 510 and the receiving unit 530 may be configured to perform processing performed by the first communications apparatus in the communication method described in the foregoing embodiment.

For example, the sending unit 510 is configured to send quality of service QoS flow information to the second communications apparatus, and is further configured to send, to the second communications apparatus, a radio bearer identifier of a QoS flow list and a radio bearer identifier corresponding to a quantity of radio bearer identifiers. The receiving unit 530 is configured to receive a QoS flow list or a quantity of radio bearer identifiers sent by the second communications apparatus.

Optionally, the sending unit 510 is further configured to: send a mapping relationship between the radio bearer identifier and the QoS flow list to the second communications apparatus, or send a radio bearer identifier having a same arrangement order as the QoS flow list to the second communications apparatus.

Optionally, the receiving unit 530 is further configured to receive at least one of types of the following information sent by the second communications apparatus: a bearer type of a radio bearer of the QoS flow list and a QoS parameter of a radio bearer of the QoS flow list.

Optionally, when the first communications apparatus is a primary base station, and the second communications apparatus is a secondary base station, the sending unit 510 is further configured to send a first GTP-U tunnel endpoint identifier to the secondary base station, where the first GTP-U tunnel endpoint identifier is used by the primary base station to receive downlink data of an SCG split bearer split by the secondary base station;

the receiving unit 530 is further configured to receive a second GTP-11 tunnel endpoint identifier sent by the secondary base station, where the second GTP-U tunnel endpoint identifier is used by the primary base station to receive uplink data of an SCG split bearer to the secondary base station;

the receiving unit 530 is further configured to receive a third GTP-U tunnel endpoint identifier sent by the secondary base station, where the third GTP-U tunnel endpoint identifier is used by the primary base station to send, to the secondary base station, uplink data of an SCG bearer or an SCG split bearer that is converted from at least one of a master cell group MCG bearer or an MCG split split bearer, or the receiving unit 530 is further configured to receive a fourth GIP-U tunnel endpoint identifier sent by the secondary base station, where the fourth GTP-U tunnel endpoint identifier is used by the primary base station to send, to the secondary base station, downlink data of an SCG bearer or an SCG split bearer that is converted from at least one of an MCG bearer or an MCG split split bearer.

Figure 6:
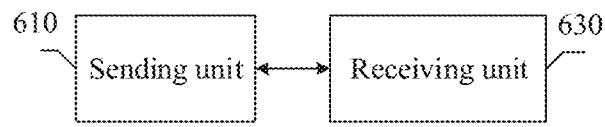
FIG. 6 is a schematic structural diagram of a communications apparatus according to an embodiment of this application.

FIG. 6 is a schematic structural diagram of a second communications apparatus according to an embodiment of this application. Meanings or functions of the following terms or nouns may be understood with reference to the foregoing description, and details or implementations of the following steps or actions may also be understood with reference to the foregoing description. As shown in FIG. 6, the second communications apparatus 600 may include a sending unit 610 and a receiving unit 630. The sending unit 610 and the receiving unit 630 may separately be connected to a bus.

The sending unit 610 and the receiving unit 630 may be configured to support the second communications apparatus and a first communications apparatus in receiving and sending information. Alternatively, the sending unit 610 and the receiving unit 630 may be configured to execute processing executed by the first communications apparatus in the communication method according to the foregoing embodiment.

For example, the receiving unit 630 is configured to receive quality of service QoS flow information sent by the first communications apparatus, and is further configured to receive a radio bearer identifier of a QoS flow list and a radio bearer identifier corresponding to a quantity of radio bearer identifiers sent by the first communications apparatus. The sending unit 510 is configured to send the QoS flow list or the quantity of radio bearer identifiers to the first communications apparatus based on the QoS flow information.

Optionally, the receiving unit 630 is further configured to receive a mapping relationship between the radio bearer identifier and the QoS flow list sent by the first communications apparatus.

Optionally, the sending unit 610 is further configured to send at least one of types of the following information to the first communications apparatus: a radio bearer type of the QoS flow list and a QoS parameter of a radio bearer of the QoS flow list.

Optionally, when the first communications apparatus is a primary base station, and the second communications apparatus is a secondary base station, the receiving unit 630 is further configured to receive a first GTP-U tunnel endpoint identifier sent by the primary base station, where the first GTP-U tunnel endpoint identifier is used by the primary base station to receive downlink data of an SCG split bearer split by the secondary base station;

the sending unit 610 is further configured to send a second GTP-U tunnel endpoint identifier to the primary base station, where the second GTP-U tunnel endpoint identifier is used by the primary base station to send uplink data of an SCG split bearer to the secondary base station;

the sending unit 610 is further configured to send a third GIP-U tunnel endpoint identifier to the primary base station, where the third GTP-U tunnel endpoint identifier is used by the primary base station to send, to the secondary base station, uplink data of an SCG bearer or an SCG split bearer that is converted from at least one of a master cell group MCG bearer or an MCG split split bearer; or the sending unit 610 is further configured to send a fourth GTP-U tunnel endpoint identifier to the primary base station, where the fourth GTP-U tunnel endpoint identifier is used by the primary base station to send, to the secondary base station, downlink data of an SCG bearer or an SCG split bearer that is converted from at least one of an MCG bearer or an MCG split split bearer.

In this embodiment, the first communications apparatus and the second communications apparatus are presented in a form in which each functional module or unit is defined in an integrated manner. The "module" or "unit" herein may be an application-specific integrated circuit (ASIC), a circuit, a processor and a memory that execute one or more software programs or firmware programs, an integrated logic circuit, and/or another component that can provide the foregoing function. In a simple embodiment, a person skilled in the art may consider that the communications apparatus 500 or 600 may use the form shown in FIG. 4. For example, the function/implementation process of the sending unit 510/receiving unit 530 in FIG. 5 may be implemented by the processor 401 and the memory 403 in FIG. 4. Specifically, the application program code stored in the memory 403 may be invoked by the processor 401, and this is not limited in this embodiment of this application. Alternatively, optionally, the function/implementation process of the sending unit 510/receiving unit 530 in FIG. 5 may be implemented by the processor 401 in FIG. 4, or may be implemented by the communications interface 404 in FIG. 4, and this is not limited in this embodiment of this application. For another example, the function/implementation process of the sending unit 610/receiving unit 630 in FIG. 6 may be implemented by the processor 401 and the memory 403 in FIG. 4. Specifically, the application program code stored in the memory 403 may be invoked by the processor 401, and this is not limited in this embodiment of this application. Alternatively, optionally, the function/implementation process of the sending unit 610/receiving unit 630 in FIG. 6 may be implemented by the processor 401, or may be implemented by the communications interface 404 in FIG. 4, and this is not limited in this embodiment of this application.

Optionally, an embodiment of this application provides a chip system. The chip system includes a processor, configured to support a communications apparatus in implementing the foregoing communication method. In a possible design, the chip system further includes a memory. The memory is configured to store a program instruction and data that are necessary for the communications apparatus. The chip system may include a chip, or may include a chip and another discrete device. This is not specifically limited in this embodiment of this application.

The controller/processor configured to execute the base station, terminal, base station or terminal in the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logic blocks, modules, and circuits described with reference to content disclosed in the present invention. Alternatively, the processor may be a combination of processors implementing a computing function, for example, a combination of one or more microprocessors, or a combination of the DSP and a microprocessor.

Methods or algorithm steps described with reference to the content disclosed in the present invention may be implemented by hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal or a base station. Certainly, the processor and the storage medium may exist in a terminal or a base station as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another place. The storage medium may be any available medium accessible to a general-purpose or special-purpose computer.

In the foregoing embodiments of the present invention, the communication method provided in the embodiments of the present invention is described from the perspective of each network element and the interaction between the network elements. It may be understood that each network element, such as the terminal or the communications apparatus, includes hardware structures and/or software modules for executing corresponding functions, to implement the foregoing functions. A person of ordinary skill in the art should easily be aware that, the example units and algorithm steps described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention, Any modification, equivalent replacement, or improvement made within the spirit and principle of the present invention shall fall within the protection scope of the present invention.

What is claimed is:

1. A communication method, the method comprising:
   sending, by a first communications apparatus, quality of service (QoS) flow information to a second communications apparatus, wherein a QoS flow indicated by the QoS flow information corresponds to at least one bearer type;
   receiving, by the first communications apparatus, a QoS flow list sent by the second communications apparatus based on the QoS flow information, wherein the QoS flow list is mapped to a radio bearer; and
   sending, by the first communications apparatus, a radio bearer identifier of the QoS flow list to the second communications apparatus, wherein the radio bearer identifier has a same arrangement order as the QoS flow list, and wherein the radio bearer identifier corresponds to the QoS flow list in a one-to-one manner.

2. The method according to claim 1, wherein the QoS flow information comprises the at least one bearer type and all QoS flows corresponding to the at least one bearer type.

3. The method according to claim 1, wherein the QoS flow information further comprises at least one of the following:
   a QoS flow identifier, a QoS flow parameter, or a packet data unit session identifier (PUD session ID) and slicing information that correspond to the QoS flow.

4. The method according to claim 1, wherein the method further comprises:
   receiving, by the first communications apparatus, at least one of the following types of information sent by the second communications apparatus:
   a bearer type of a radio bearer of the QoS flow list; or
   a QoS flow parameter of the radio bearer of the QoS flow list.

5. The method according to claim 1, wherein:
   the first communications apparatus is a primary base station, and the second communications apparatus is a secondary base station; or
   the first communications apparatus is a central unit (CU), and the second communications apparatus is a distributed unit (DU).

6. The method according to claim 5, wherein the first communications apparatus is the primary base station, and wherein the second communications apparatus is the secondary base station; and wherein when the bearer type is a secondary cell group (SCG) split bearer or an SCG-master cell group (MCG) bearer, the method further comprises:
  sending, by the primary base station, a first general packet radio service (GPRS) tunneling protocol-U (GTP-U) tunnel endpoint identifier to the secondary base station, wherein the first GTP-U tunnel endpoint identifier is used by the primary base station to receive downlink data of the SCG split bearer or the SCG-MCG bearer split by the secondary base station; and
  receiving, by the primary base station, a second GTP-U tunnel endpoint identifier sent by the secondary base station, wherein the second GTP-U tunnel endpoint identifier is used by the primary base station to send uplink data of the SCG split bearer or the SCG-MCG bearer to the secondary base station.

7. The method according to claim 6, further comprising:
receiving, by the primary base station, a third GTP-U tunnel endpoint identifier sent by the secondary base station, wherein the third GTP-U tunnel endpoint identifier is used by the primary base station to send, to the secondary base station, uplink data of at least one of an SCG bearer, the SCG split bearer, or the SCG-MCG bearer that are converted from at least one of an MCG bearer, an MCG split bearer, or an MCG-SCG bearer; or
receiving, by the primary base station, a fourth GTP-U tunnel endpoint identifier sent by the secondary base station, wherein the fourth GTP-U tunnel endpoint identifier is used by the primary base station to send, to the secondary base station, downlink data of at least one of an SCG bearer, the SCG split bearer, or the SCG-MCG bearer that are converted from at least one of an MCG bearer, an MCG split bearer, or an MCG-SCG bearer.

8. The method according to claim 1, wherein the QoS flow is uplink data or downlink data having a same QoS parameter.

9. A first communications apparatus, the first communications apparatus comprising:
  at least one processor:
  a memory storing instructions executable by the at least one processor, wherein the instructions, when executed by the at least one processor, instruct the at least one processor to:
    send quality of service (QoS) flow information to a second communications apparatus, wherein a QoS flow indicated by the QoS flow information corresponds to at least one bearer type; and
    receive a QoS flow list sent by the second communications apparatus based on the QoS flow information, wherein the QoS flow list is mapped to a radio bearer; and
    send a radio bearer identifier of the QoS flow list to the second communications apparatus, wherein the radio bearer identifier has a same arrangement order as the QoS flow list, and wherein the radio bearer identifier corresponds to the QoS flow list in a one-to-one manner.

10. The first communications apparatus according to claim 9, wherein the QoS flow information comprises the at least one bearer type and all QoS flows corresponding to the at least one bearer type.

11. The first communications apparatus according to claim 9, wherein the QoS flow information further comprises at least one of the following:

a QoS flow identifier, a QoS flow parameter, or a packet data unit session identifier (PUD session ID) and slicing information that correspond to the QoS flow.

12. The first communications apparatus according to claim 9, wherein the instructions further instruct the at least one processor to receive at least one of the following types of information sent by the second communications apparatus:
  a bearer type of a radio bearer of the QoS flow list; or
  a QoS flow parameter of the radio bearer of the QoS flow list.

13. The first communications apparatus according to claim 9, wherein:
  the first communications apparatus is a primary base station, and the second communications apparatus is a secondary base station; or
  the first communications apparatus is a central unit (CU), and the second communications apparatus is a distributed unit (DU).

14. The first communications apparatus according to claim 13, wherein the first communications apparatus is the primary base station, wherein the second communications apparatus is the secondary base station, and
  wherein when the bearer type is a secondary cell group (SCG) split bearer or an SCG-master cell group (MCG) bearer,
    the instructions further instruct the at least one processor to send a first general packet radio service (GPRS) tunneling protocol-U (GTP-U) tunnel endpoint identifier to the secondary base station, wherein the first GTP-U tunnel endpoint identifier is used by the primary base station to receive downlink data of the SCG split bearer or the SCG-MCG bearer split by the secondary base station; or
    the instructions further instruct the at least one processor to receive a second GTP-U tunnel endpoint identifier sent by the secondary base station, wherein the second GTP-U tunnel endpoint identifier is used by the primary base station to send uplink data of the SCG split bearer or the SCG-MCG bearer to the secondary base station.

15. The first communications apparatus according to claim 14, wherein the instructions further instruct the at least one processor to:
  receive a third GTP-U tunnel endpoint identifier sent by the secondary base station, wherein the third GTP-U tunnel endpoint identifier is used by the primary base station to send, to the secondary base station, uplink data of at least one of an SCG bearer, the SCG split bearer, or the SCG-MCG bearer that are converted from at least one of an MCG bearer, an MCG split bearer, or an MCG-SCG bearer; or
  receive a fourth GTP-U tunnel endpoint identifier sent by the secondary base station, wherein the fourth GTP-U tunnel endpoint identifier is used by the primary base station to send downlink data of at least one of an SCG bearer, the SCG split bearer, or the SCG-MCG bearer that are converted from at least one of an MCG bearer, an MCG split bearer, or an MCG-SCG bearer to the secondary base station.

16. The first communications apparatus according to claim 9, wherein the QoS flow is uplink data or downlink data having a same QoS parameter.

17. A base station, the base station comprising a first communications apparatus, the first communications apparatus comprising:
  at least one processor:

a memory storing instructions executable by the at least one processor, wherein the instructions, when executed by the at least one processor, instruct the at least one processor to:
send quality of service (QoS) flow information to a second communications apparatus, wherein a QoS flow indicated by the QoS flow information corresponds to at least one bearer type; and
receive a QoS flow list sent by the second communications apparatus based on the QoS flow information, wherein the QoS flow list is mapped to a radio bearer; and
send a radio bearer identifier of the QoS flow list to the second communications apparatus, wherein the radio bearer identifier has a same arrangement order as the QoS flow list, and wherein the radio bearer identifier corresponds to the QoS flow list in a one-to-one manner.

18. A non-transitory computer readable storage medium, the computer readable storage medium comprising an instruction, wherein when the instruction is run on a computer, the computer is enabled to perform a following communication method comprising:
sending, by a first communications apparatus, quality of service (QoS) flow information to a second communications apparatus, wherein a QoS flow indicated by the QoS flow information corresponds to at least one bearer type;
receiving, by the first communications apparatus, a QoS flow list sent by the second communications apparatus based on the QoS flow information, wherein the QoS flow list is mapped to a radio bearer; and
sending, by the first communications apparatus, a radio bearer identifier of the QoS flow list to the second communications apparatus, wherein the radio bearer identifier has a same arrangement order as the QoS flow list, and wherein the radio bearer identifier corresponds to the QoS flow list in a one-to-one manner.

* * * * *